(12) United States Patent
Payne et al.

(10) Patent No.: US 7,177,108 B2
(45) Date of Patent: *Feb. 13, 2007

(54) EMULATION OF AUXILIARY MEMORY

(75) Inventors: Mark A. Payne, Longmont, CO (US); Dwayne A. Edling, Longmont, CO (US); Douglas F. Barbian, Lakewood, CO (US); Theron S. White, Boulder, CO (US)

(73) Assignee: Quantum Corporation, San Jose, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 10/858,911

(22) Filed: Jun. 1, 2004

(65) Prior Publication Data

US 2004/0249624 A1 Dec. 9, 2004

Related U.S. Application Data

(60) Provisional application No. 60/475,679, filed on Jun. 3, 2003.

(51) Int. Cl.
*G11B 19/02* (2006.01)
(52) U.S. Cl. .......................................... 360/69; 711/4
(58) Field of Classification Search .................. None
See application file for complete search history.

(56) References Cited

U.S. PATENT DOCUMENTS

| | | | |
|---|---|---|---|
| 5,406,955 A * | 4/1995 | Bledsoe et al. ............ 600/524 |
| 5,828,905 A | 10/1998 | Rao | |
| 5,852,534 A | 12/1998 | Ozue et al. .................. 360/69 |
| 5,892,633 A | 4/1999 | Ayres et al. ............. 360/73.08 |
| 5,894,425 A | 4/1999 | Saliba | |
| 6,043,948 A | 3/2000 | Takayama ................... 360/69 |
| 6,075,669 A | 6/2000 | Takayama ................... 360/69 |
| 6,084,736 A * | 7/2000 | Kurokawa et al. ........... 360/71 |
| 6,269,422 B1 | 7/2001 | McDonald et al. ......... 711/111 |
| 6,408,405 B1 | 6/2002 | McDonald et al. .......... 714/39 |

(Continued)

FOREIGN PATENT DOCUMENTS

EP 0 991 071 A2 4/2000

(Continued)

OTHER PUBLICATIONS

Crighton, I. (1998). "Proposal for Storage and Access of Data on Media Auxiliary Memory," *Hewlett-Packard* pp. 1-10.

(Continued)

*Primary Examiner*—Andrew L. Sniezek
(74) *Attorney, Agent, or Firm*—Morrison & Foerster LLP

(57) ABSTRACT

A system and method of operating a storage system is provided. The storage system includes a tape drive for reading and writing data to a magnetic tape medium of a tape storage media device, and an auxiliary memory emulator for receiving I/O commands to perform I/O operations on an auxiliary memory and for rerouting the commands to perform the I/O operations on the magnetic tape medium of the tape storage media device. The method includes receiving I/O commands to perform I/O operations on an auxiliary memory on a tape storage media device, wherein the tape storage media device includes a magnetic tape medium and does not include the auxiliary memory, and routing the I/O commands to the magnetic tape medium provided in the tape storage media device.

18 Claims, 5 Drawing Sheets

U.S. PATENT DOCUMENTS

| | | | |
|---|---|---|---|
| 6,425,042 B1 * | 7/2002 | Ikeda et al. | 711/4 |
| 6,501,612 B1 | 12/2002 | Kato et al. | 360/69 |
| 6,519,105 B1 | 2/2003 | Takayama | 360/55 |
| 6,535,344 B1 | 3/2003 | Takayama | 360/60 |
| 6,674,596 B1 * | 1/2004 | Takayama | 360/69 |
| 2002/0067564 A1 | 6/2002 | Azuma | |
| 2002/0126410 A1 | 9/2002 | Doi et al. | |
| 2004/0153689 A1 | 8/2004 | Assaf | |

FOREIGN PATENT DOCUMENTS

| | | |
|---|---|---|
| EP | 0 991 071 A3 | 4/2000 |

OTHER PUBLICATIONS

Jerman, S. (Jul. 13, 1999). "Proposal for Storage and Access of Data on Media Auxiliary Memory," Document T10/99-232r0, pp. 2-18.

Jerman, S. et al. (May 4, 2000). "Proposed Addition of Read and Write Attribute Commands to SPC-2," Document T10/99-148r7, pp. 1-23.

Weber, R. O. (May 16, 2003). Information Technology—SCSI Primary Commands—3 (SPC—3), Working draft for Project T10/1416-D, *INCITS* 22 pages.

European Search Report mailed on Nov. 24, 2004 for EP application No. 04254327.2, 3 pages.

Nasi. "HP Ultrium 230 Tape Drive," located at <http://web.archive.org/web/20030619022110/www.nasi.com/hp_ultrium230.htm.22 , last visited on Oct. 21, 2004, pp. 1.

Hewlett Packard. "HP Ultrium 230 Tape Drive Products Range," located at <http://web.archive.orgweb/20030611141841/www.nasi.com/pdfs/HP-UltriumPrimer.pdf>, last visited on Oct. 21, 2004, pp. 1-10.

* cited by examiner

EMULATION OF AUXILIARY MEMORY

CROSS REFERENCE TO RELATED APPLICATIONS

This application claims the benefit of U.S. Provisional Application No. 60/475,679, entitled, "EMULATION OF AUXILIARY MEMORY ON MAGNETIC TAPE MEDIA", filed on Jun. 3, 2003, the disclosure of which is incorporated herein in its entirety as if fully set forth below.

BACKGROUND OF THE INVENTION

Storage subsystems, such as magnetic tape libraries, are widely used for storing information in digital form. An exemplary tape storage subsystem 100 is shown in FIG. 1. These tape subsystems 100 may include a storage subsystem controller 101 for controlling one or more tape drives 102 contained within the storage subsystem 100 and for controlling other components of the storage subsystem 100, such as the tape picker, which is used to select and load tape cartridges 106 into the tape drives 102. The storage subsystem 100 may be coupled to a host system 110 which transmits I/O requests to the storage subsystem 100 via a host/storage connection 112.

The tape drive 102 reads and writes data to the primary storage medium, shown in FIG. 1 as a magnetic tape medium 104 contained within a removable magnetic tape cartridge 106. The magnetic tape medium 104 typically comprises a thin film of magnetic material which stores the data. The tape medium 104 may be moved by the tape drive 102 between a pair of spaced apart reels and past a data transducer to record or read back information. In one type of tape drive system, one of the reels is part of the tape drive 102 while the other reel is part of the removable tape cartridge 106. For this type of tape drive system, the reel which is a part of the tape drive 102 is commonly referred to as a take-up reel, while the reel which is a part of the tape cartridge 106 is commonly referred to as a cartridge reel. Upon insertion of the tape cartridge 106 into the tape drive 102, the magnetic tape medium 104 on the cartridge reel is coupled to the take-up reel of the tape drive 102. Subsequently, prior to removing the tape cartridge 106 from the tape drive 102, the storage tape 104 is rewound onto the cartridge reel and is then uncoupled from the take-up reel.

In some tape storage subsystems, the removable tape cartridge 106 is provided with a non-volatile auxiliary memory 108 for storing data in a separate storage medium from the primary storage medium. This data is separate from and in addition to the data stored on the primary storage medium. This auxiliary memory 108 can be, for example, a solid state non-volatile memory such as an electrically erasable programmable read-only memory (EEPROM) or a flash memory which is contained in the housing for the tape cartridge 106. One standard being proposed for incorporating and using such an auxiliary memory in a tape cartridge is referred to as "Medium Auxiliary Memory" (or MAM). This proposed standard is described in "Working Draft SCSI Primary Commands-3 (SPC-3)", Project T10/1416-D, Revision 13, dated May 16, 2003, incorporated by reference herein in its entirety. According to the MAM standard, tape storage subsystems provide access to an auxiliary memory provided in a tape cartridge using vendor-independent, SCSI-standard commands. These SCSI commands can be used to read and/or write data to the auxiliary memory in accordance with certain pre-determined commands. This standardization can enable any application residing on a host system 110 to access and utilize the auxiliary memory 108 of any MAM-compliant vendor's tape storage subsystem 100 using standard commands. Similarly, a MAM-compliant storage subsystem 100 or tape drive 102 can also read and/or write to the auxiliary memory 108 using standard SCSI-defined commands.

Auxiliary memories can be used to store useful data describing the tape media and its contents to improve tape drive performance or capability. However, a host application designed to access a tape cartridge's auxiliary memory may as a result become incompatible with tape cartridges lacking auxiliary memories. Accordingly, it may be desirable to provide storage systems which accommodate host applications designed to utilize auxiliary memories in conjunction with tape cartridges lacking the auxiliary memory.

BRIEF SUMMARY OF THE INVENTION

In accordance with embodiments of the present invention, a storage system is provided. The storage system comprises a tape drive for reading and writing data to a magnetic tape medium of a tape cartridge; and an auxiliary memory emulator for receiving I/O commands to perform I/O operations on an auxiliary memory and for rerouting the commands to perform the I/O operations on the magnetic tape medium of the tape cartridge.

In accordance with other embodiments of the present invention, a method of operating a storage system is provided. The method comprises receiving I/O commands to perform I/O operations on an auxiliary memory on a tape cartridge, wherein the tape cartridge includes a magnetic tape medium and does not include the auxiliary memory; and routing the I/O commands to the magnetic tape medium provided in the tape cartridge.

In accordance with other embodiments of the present invention, a storage system is provided, comprising: a tape drive for reading and writing data to a magnetic tape medium of a tape storage media device; an auxiliary memory emulation means for receiving I/O commands to perform I/O operations on an auxiliary memory and for rerouting the I/O commands to perform the I/O operations on the magnetic tape medium of the tape storage media device.

In accordance with other embodiments of the present invention, a tape storage media device is provided, comprising: a housing; and a magnetic tape medium comprising: a beginning of tape indicator; an end of tape indicator; a data portion positioned between the beginning of tape indicator and the end of tape indicator; and a emulated auxiliary memory region positioned between the beginning of tape indicator and a tape leader, the emulated auxiliary memory region storing data resulting from I/O operations rerouted from I/O commands to store data on an auxiliary memory.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION OF THE INVENTION

In the following description, reference is made to the accompanying drawings which illustrate several embodiments of the present invention. It is understood that other embodiments may be utilized and structural and operational changes may be made without departing from the scope of the present invention.

Some portions of the detailed description which follows are presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical or magnetic signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
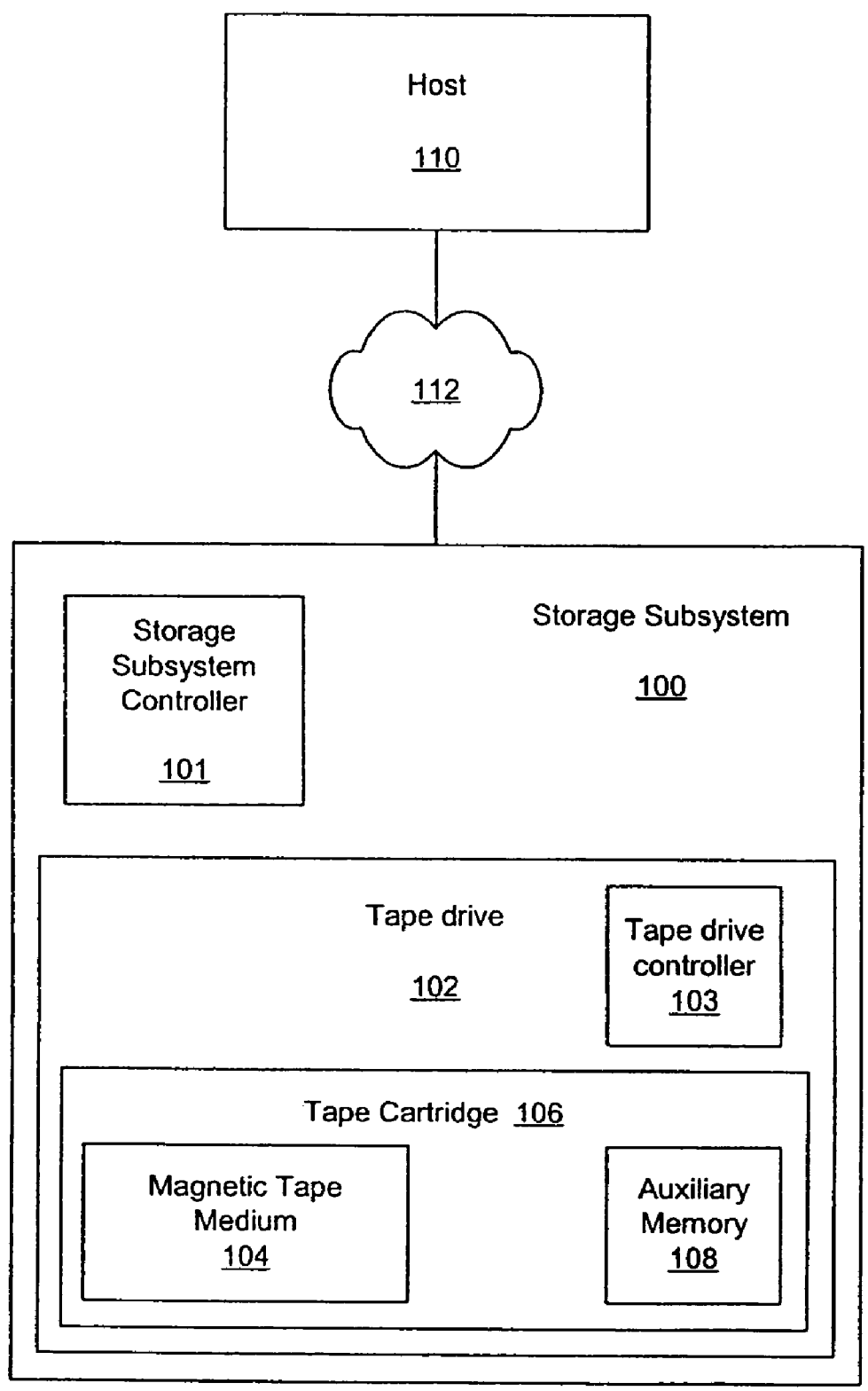
FIG. 1 shows a tape storage subsystem.
Figure 2:
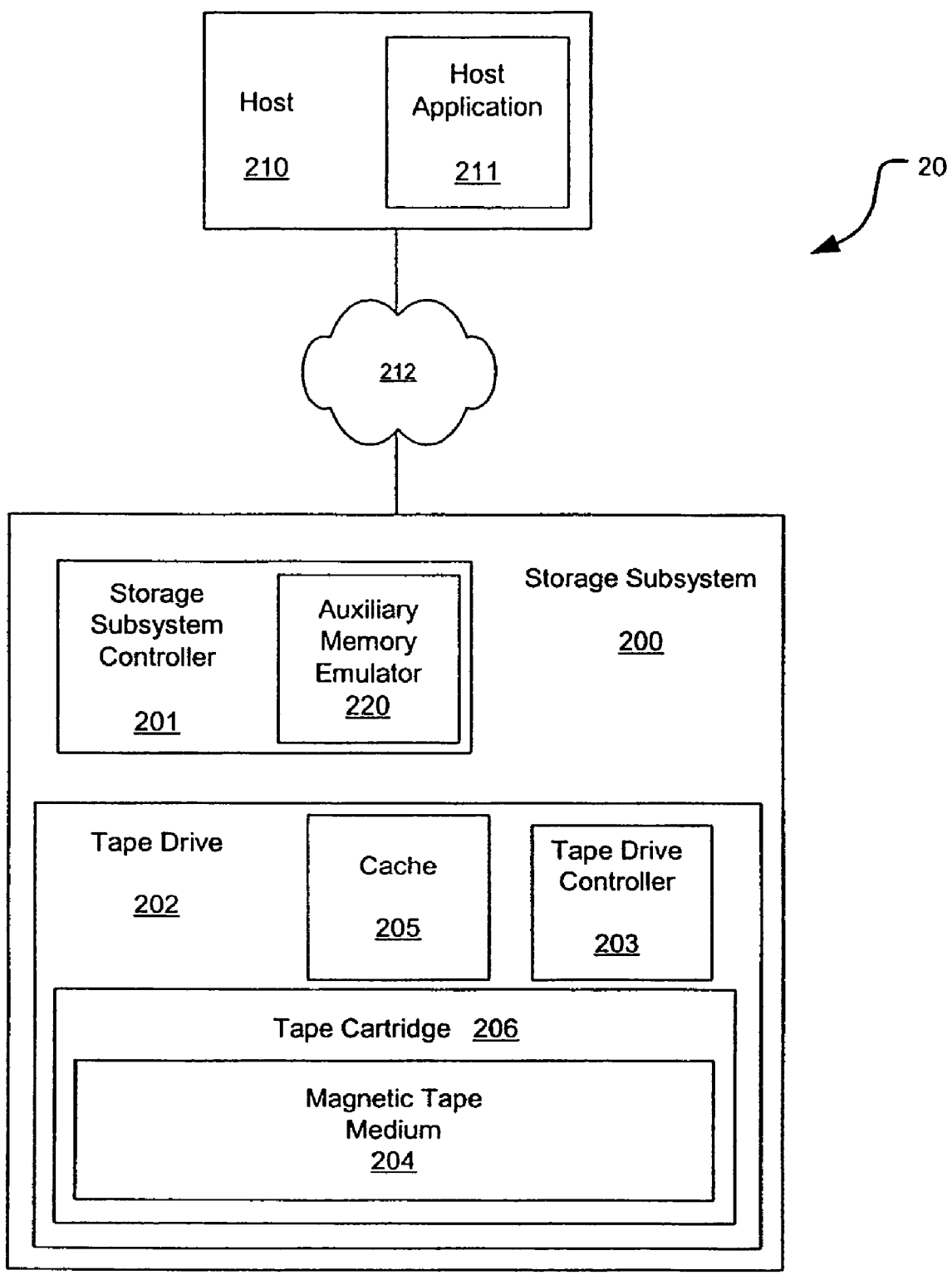
FIG. 2 shows a simplified block diagram of a storage subsystem in accordance with embodiments of the present invention.

FIG. 2 shows a simplified block diagram of a system 20 including a storage subsystem 200 in accordance with embodiments of the present invention. In the illustrated embodiment, the storage subsystem 200 includes a storage subsystem controller 201 and one or more tape drives 202 (for clarity, only one tape drive is shown). Each tape drive 202 may include a tape drive controller 203 and a removable tape storage media device. In this case, the removable tape storage media device comprises a tape cartridge 206 including a magnetic tape medium 204 as the primary storage medium for storing data and does not include an auxiliary memory.

Any number of data formats may be utilized for the tape storage media device. Exemplary data formats include well known data formats, e.g., associated with Linear Tape-Open (LTO) tape, Digital Linear Tape (DLT), Super DLT (SDLT), and the like. The varying data formats may include various other known and unknown data formats, e.g., future developed data formats.

The following discussion describes examples particularly applicable as part of a linear tape drive system utilizing thinfilm magnetic tape heads for performing read and write operations on magnetic media (such as magnetic particle tape). Additionally, the magnetic media discussed herein comprises magnetic recording tape. It will be understood, however, that the various examples may be useful with other tape storage media and devices, such as tape cassettes including two tape reels.

A host system 210 is coupled to the storage subsystem 200 via a host/storage connection 212. The host system 102 may comprise any computational device known in the art including, for example, a server class machine, a mainframe, a desktop computer, a laptop computer, a hand held computer, or a telephony device. The host/storage connection 212 can be, for example, a local bus, a network connection, an interconnect fabric, or other communication channel. In some embodiments, a plurality of host systems 210 can be in communication with the storage subsystem 200 via the host/storage connection 212, or a plurality of storage subsystems 200 can be in communication with one or more host systems 210.

The host system 210 may include a host application 211 which transmits I/O requests to read and/or write data to the magnetic tape medium 204. This host application 211 may also be configured to read and/or write data to an auxiliary memory provided in the tape cartridge. However, as described above, the tape cartridge 206 loaded into the tape drive 202 is not provided with an auxiliary memory. In a conventional system, such an I/O request from the host application 211 to a non-existent auxiliary memory may result in an error, a failure, or other non-optimal functioning of the storage subsystem 200.

In accordance with embodiments of the present invention, an auxiliary memory emulator is provided for receiving I/O requests to read and/or write data to an expected but non-existent auxiliary memory. The auxiliary memory emulator further reroutes those I/O requests to read and/or write the data to the primary storage medium (e.g., the magnetic tape medium). In FIG. 2, an auxiliary memory emulator 220 is provided as part of the storage subsystem controller 201. The auxiliary memory emulator 220 may comprise code provided in hardware, firmware, or memory for rerouting the I/O requests to the auxiliary memory.

Figure 3:
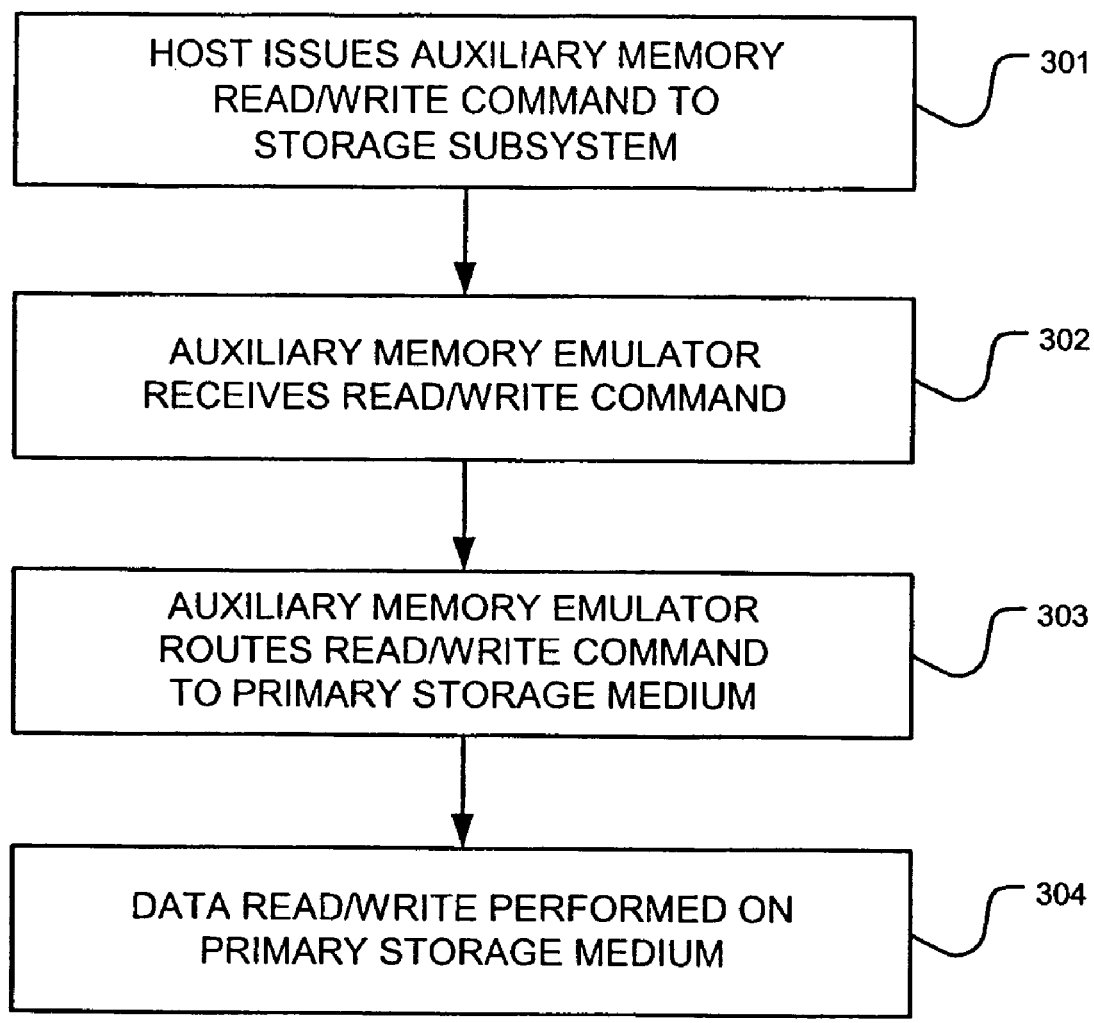
FIG. 3 is a flowchart showing a method of emulating an auxiliary memory in accordance with embodiments of the present invention.

FIG. 3 is a flowchart showing a method of emulating an auxiliary memory using the system illustrated in FIG. 2 in accordance with embodiments of the present invention. In step 301, the host system 210 issues an I/O request using a command to read and/or write to the auxiliary memory which the host application 211 is programmed to expect to be contained in the tape cartridge 206. This I/O request can be, for example, a READ ATTRIBUTE or WRITE ATTRIBUTE command to a Medium Auxiliary Memory (MAM) in compliance with the SCSI Primary Commands-3 specification. The READ ATTRIBUTE command can be used to retrieve attribute data. The WRITE ATTRIBUTE command can be used to store attribute data. These commands are intended to be vendor-independent and can be adopted by any host application.

In step 302, this read/write command is received by the auxiliary memory emulator 220 in the storage subsystem controller 201. In some embodiments, the storage subsystem controller 201 may include a host interface for receiving all I/O requests (such as the standard SCSI commands described above) and the auxiliary memory emulator 220 may be a component of the software or firmware incorporated into the storage subsystem controller 201 for handling the I/O requests. For example, when a SCSI WRITE ATTRIBUTE command to write data to the MAM is issued by the host application 221, the storage subsystem controller 201 recognizes that the tape cartridge 206 does not include a MAM chip to which the data can be written. The SCSI WRITE ATTRIBUTE command is handled by the auxiliary memory emulator 220. In some embodiments, the tape drive 202 is configured to read and/or write data only to the magnetic tape medium 204 and does not include an interface for reading and/or writing data to an auxiliary memory. In this situation, the firmware in the storage subsystem controller 201 is adapted to automatically route all I/O requests for the auxiliary memory to the auxiliary memory emulator 220. In other embodiments, the tape drive 202 may be configured to first determine whether the tape cartridge currently loaded in the tape drive 202 includes an auxiliary memory. If an auxiliary memory is located, then the I/O requests to the auxiliary memory are passed onto the auxiliary memory. If an auxiliary memory is not located, then the I/O requests are handled by the auxiliary memory emulator 220.

In step 303, the auxiliary memory emulator 220 routes the command to read and/or write the data to the primary storage medium. In FIG. 2, the primary storage medium is the magnetic tape medium 204 in the tape cartridge 206. In step 304, the data read/write is performed on the primary storage medium (e.g., the magnetic tape medium 204).

Figure 4:
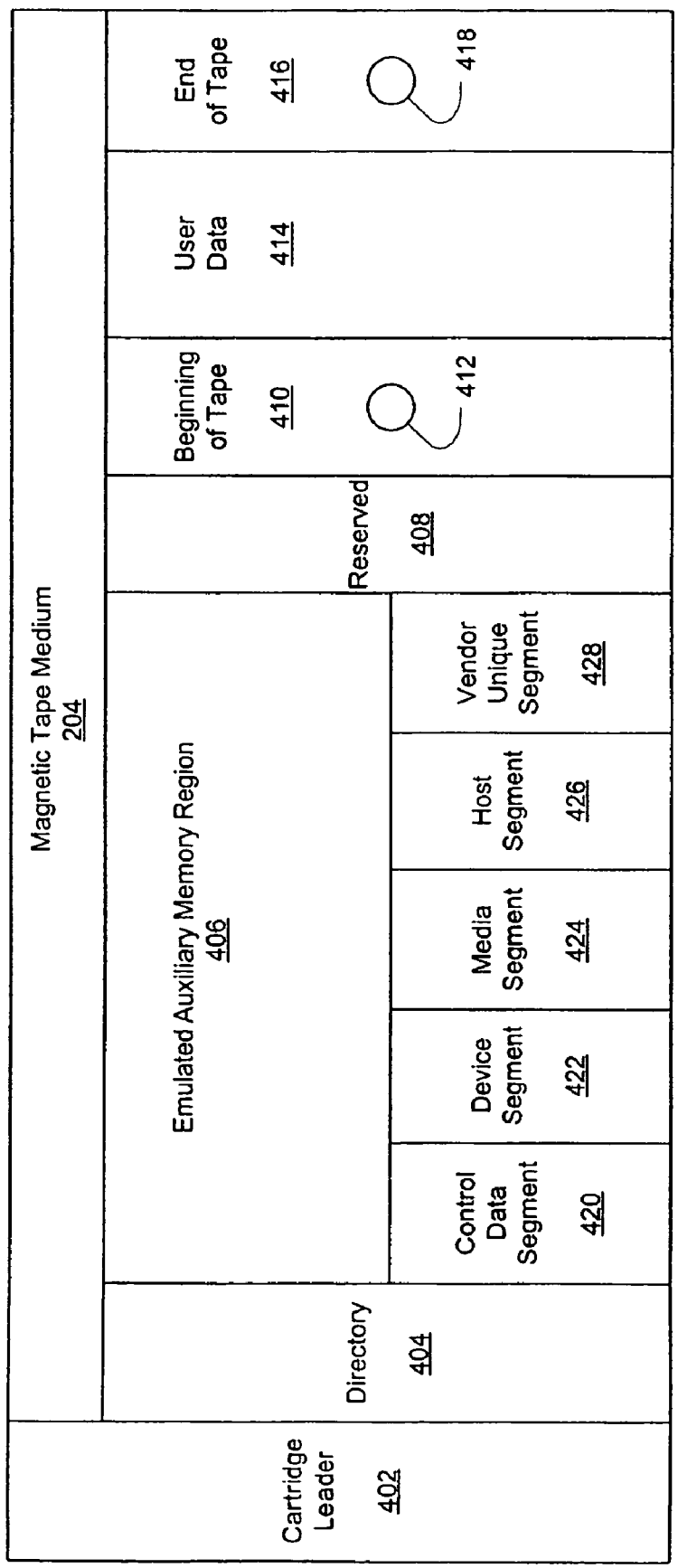
FIG. 4 is a block diagram illustrating a region of the magnetic tape medium utilized for the emulated auxiliary memory in accordance with embodiments of the present invention.

FIG. 4 is a block diagram illustrating a region of the magnetic tape medium 204 utilized for the emulated auxiliary memory in accordance with embodiments of the present invention. At the beginning of the magnetic tape medium 204 is the cartridge leader 402. The cartridge leader 402 is coupled to the buckle mechanism for coupling with a drive leader of the tape drive 202 and is not used to store data. Next is a directory region 404, which stores conventional directory data used to enable the tape drive 302 to access user data in an efficient manner. A calibration region (not shown) may also be provided before the directory region 404 for assisting the tape drive 202 in its initial calibration process. The directory region 404 is followed by an emulated auxiliary memory region 406. The emulated auxiliary memory region 406 is used to store data that would have been stored in a separate auxiliary memory provided in the tape cartridge 206. The emulated auxiliary memory region 406 can be segmented into multiple regions for storing specific types of data and having different types of access restrictions. Next is a reserved region 408 which contains a predetermined amount of recordable space reserved for future use. The reserved region 408 can be used, for example, to expand the emulated auxiliary memory region 406, if additional capacity is desired.

After the reserved region 408 is a beginning of tape region 410, which is indicated by a beginning of tape hole 412. The tape drive 202 searches for the beginning of tape hole 412 to determine where to begin storing the user data in the user data region 414. It will be noted that FIG. 4 is not to scale; in typical tape cartridges, the user data region 414 consumes the vast majority of the length of the magnetic tape medium 204. After the user data region 414 is an end of tape region 416 marked by an end of tape hole 418.

In one embodiment, the structure of the emulated auxiliary memory region 406 corresponds to the data structure defined by the SCSI standard for MAM. In accordance with the SCSI-standard READ ATTRIIBUTE and WRITE ATTRIBUTE commands, data may be written to and/or read from a device segment 422, a media segment 424, and a host segment 426 provided in the emulated auxiliary memory region 406. The SCSI standard provides detailed requirements for the various data segments. In other embodiments, the emulated auxiliary memory region 406 may not adhere to the SCSI standard and the various segment types and access rules for those segments may vary.

In the embodiment shown in FIG. 4, the device segment 422 can be used to store device attributes. These device attributes can include data regarding the operation of the tape drive 202, such as, for example, the load count for that particular tape cartridge 206. It may be desired to restrict write access to the device segment 422 to the tape drive controller 203, and to limit the host system 202 to read access only. The media segment 424 can be used to store attributes of the magnetic tape medium 204. These attributes can include, for example, the tape manufacturer's identity, the production date, or other information relating to the identity of the tape medium 204. It may be desired to restrict write access to the media segment 424 to only the original tape manufacturer. The tape drive controller 203, the storage subsystem controller 201, and the host system 210 may be limited to read-only access to this media segment 424. Finally, the host segment 426 can be used to store host attributes. These host attributes may include any data which the host application 211 may wish to store. This can include, for example, a tape label, a date stamp, and information identifying the host application 211 writing the data to the tape cartridge. It may be desired to provide unlimited read and write access to the host area 412. A control data segment 420 may also be provided for managing the updates to the emulated auxiliary memory region 406 over the life of the tape cartridge 206, and a vendor unique segment 428 may be provided for storing vendor data.

It is to be understood that the above-described structure, location, and access rules for the emulated auxiliary memory region 406 are exemplary. In other embodiments, the emulated auxiliary memory region may be provided in a different location on the magnetic tape medium 204 or may be stored in multiple locations on the magnetic tape medium 204. The type, arrangement, and content of data being stored (e.g., device attributes, medium attributes, and host attributes) and the read/write restrictions on that data may vary. The use of standard SCSI-compliant commands to read and/or write data to the emulated auxiliary memory region 406 can provide improved compatibility between various tape drives, storage subsystems, and host applications. However, in other embodiments, alternative I/O commands may be used to access the emulated auxiliary memory region 406.

In some embodiments, all of the data stored in the emulated auxiliary memory area 406 may be read into a cache memory 205 provided in the tape drive 202 or the tape drive controller 203 during initial loading of the tape cartridge 206 in the tape drive 202. Then, as the host system 210 issues read commands to auxiliary memory, the auxiliary memory emulator 220 may retrieve the requested data from the cache memory 205 instead of reading the data directly from the magnetic tape medium. Similarly, any write commands to auxiliary memory are routed by the auxiliary memory emulator 220 to the cache memory 205. Before the tape cartridge 206 is unloaded from the tape drive 202, the contents of the cache memory 205 are recorded to the emulated auxiliary memory area 406 of the magnetic tape medium 204. Then, the next time the tape cartridge 206 is loaded into the tape drive 202 or another tape drive, the contents of the emulated auxiliary memory area 406 can be read into cache and the data accessed by host system 210 or another host. Therefore, the data stored in the emulated auxiliary memory area 406 is stored with the tape cartridge 206 to which the data relates. This may provide more efficient storage of the attribute data than if the attribute data were stored elsewhere, such as on host 210, because the attribute data is more directly associated with its corresponding tape cartridge 206. In other systems where the attribute data is stored only in the cache memory 205 and not transferred to the magnetic tape medium 204, the attribute data may be lost once the cache memory 205 is cleared for use with another tape cartridge.

Figure 5:
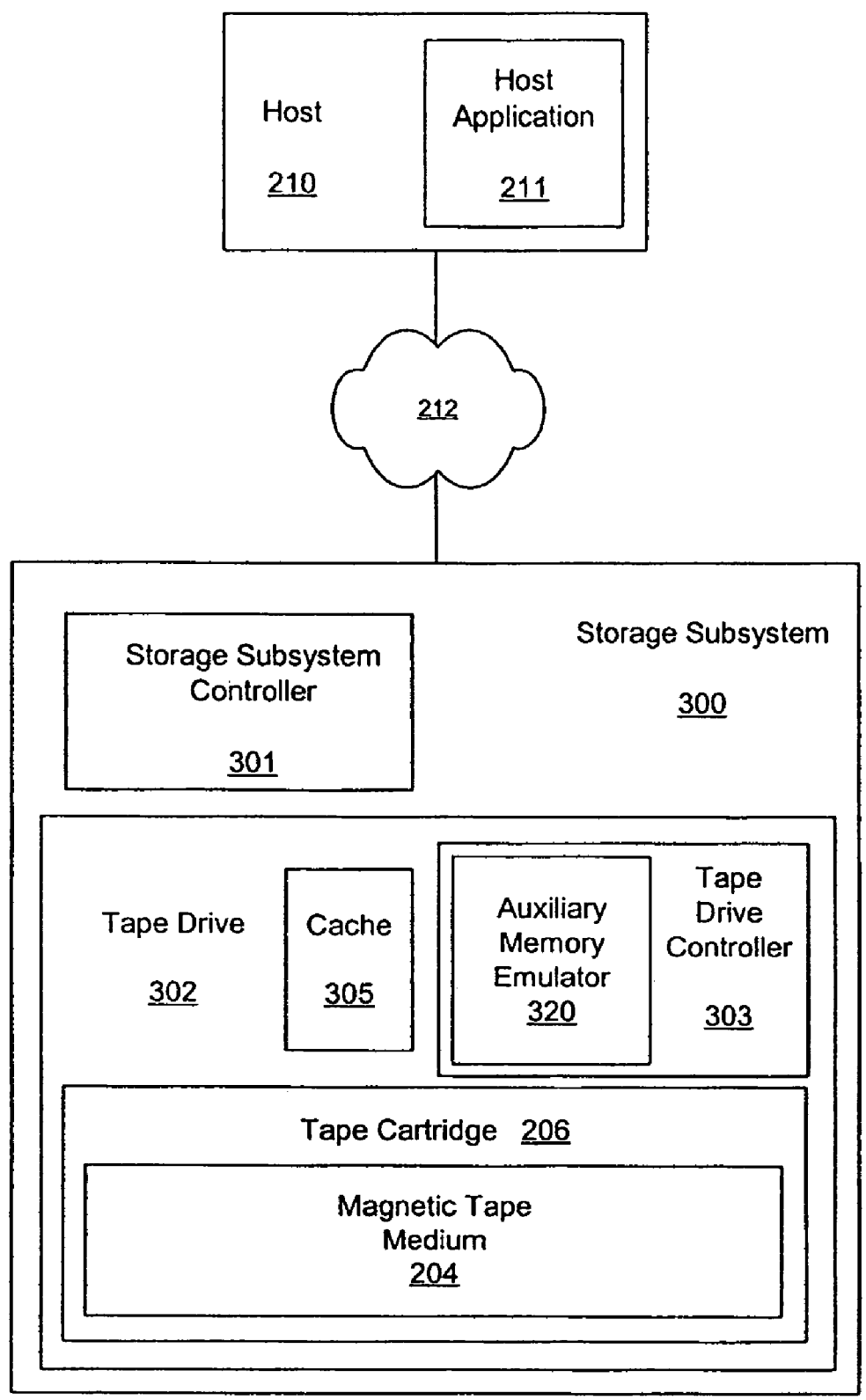
FIG. 5 shows a simplified block diagram of a storage subsystem in accordance with other embodiments of the present invention.

FIG. 5 shows an alternative embodiment of the present invention in which an auxiliary memory emulator 320 is provided in a tape drive 302. The emulator 320 may be integrated within the tape drive controller 303. In this embodiment, the host 210, the host application 211, the storage subsystem 300, and the storage subsystem controller 301 treat the read/write commands to the auxiliary memory as if the tape cartridge 206 included a separate auxiliary memory. Here, the read/write commands (e.g., SCSI READ ATTRIBUTE and/or WRITE ATTRIBUTE commands) to the auxiliary memory are passed from the storage subsystem controller 301 to the tape drive 302. These commands are received by the auxiliary memory emulator 320 in the tape drive controller 303, and the auxiliary memory emulator 320 executes the read/write commands on the magnetic tape medium 204, as described above with respect to FIG. 2.

By utilizing the method illustrated in FIG. 3, a device or application such as, for example, host application 211, can attempt to read and/or write data using commands normally intended for accessing data on an auxiliary memory, even when the tape cartridge 206 is not provided with such an auxiliary memory. Instead of receiving an error message, the auxiliary memory emulator 220 can reroute the I/O requests to an emulated auxiliary memory region 406 on the magnetic tape medium 204. This rerouting of the I/O request can be performed transparently to the device or application issuing the I/O request. In other words, the device issuing the I/O request can operate normally as if storing data to the tape cartridge having an auxiliary memory, but be used with tape cartridges lacking such a memory. This can enable devices designed to operate under the SCSI MAM standard to be backward compatible with tape cartridges lacking an auxiliary memory.

The emulated auxiliary memory region 406 can also be used to store data useful for diagnostics or predictive maintenance. In particular, statistical data regarding the operation of the tape cartridge 202 can be stored and analyzed by the storage subsystem 200 or the host system 210 to predict when a likelihood of imminent failure increases in order to initiate a failover or backup operation.

The program logic described herein indicates certain events occurring in a certain order. In alternative implementations, the order of certain logic operations may be varied, modified or removed. Moreover, steps may be added to the above described logic and still conform to the described implementations. Further, operations described herein may occur sequentially or certain operations may be processed in parallel.

The foregoing description of the preferred embodiments of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A storage system, comprising:
   a tape drive for reading and writing data to a magnetic tape medium of a tape storage media device;
   an auxiliary memory emulator for receiving I/O commands to perform I/O operations on an auxiliary memory and for rerouting the I/O commands to perform the I/O operations on the magnetic tape medium of the tape storage media device only if no auxiliary memory is present in the tape storage media device.

2. The storage system of claim 1, wherein the I/O commands comprise SCSI-compliant READ ATTRIBUTE or WRITE ATTRIBUTE commands.

3. The storage system of claim 1, further comprising a tape drive controller, wherein the auxiliary memory emulator is disposed in the tape drive controller.

4. The storage system of claim 3, wherein:
   if the tape drive controller determines that an auxiliary memory is available on the tape storage media device, the auxiliary memory emulator routes the I/O commands to perform the I/O operations on the auxiliary memory; and
   if the tape drive controller determines that an auxiliary memory is not available on the tape storage media device, the auxiliary memory emulator routes the I/O commands to perform the I/O operations on the magnetic tape medium of the tape storage media device.

5. The storage system of claim 1, further comprising a storage system controller, wherein the auxiliary memory emulator is disposed in the storage system controller.

6. The storage system of claim 1, further comprising a cache for temporarily storing data associated with the I/O operations.

7. A method of operating a storage system, comprising:
   receiving I/O commands to perform I/O operations on an auxiliary memory on a tape storage media device, wherein the tape storage media device includes a magnetic tape medium and does not include the auxiliary memory;
   determining whether an auxiliary memory is present in the tape storage media device; and
   routing the I/O commands to the magnetic tape medium disposed in the tape storage media device, wherein the routing the I/O commands to the magnetic tape medium disposed in the tape storage media device is only performed if no auxiliary memory is present in the tape storage media device.

8. The method of claim 7, wherein the I/O commands comprise SCSI-compliant READ ATTRIBUTE or WRITE ATTRIBUTE commands.

9. The method of claim 7, further comprising:
   loading the tape storage media device into a tape drive;
   reading data from an emulated auxiliary memory region of the magnetic tape medium of the tape storage media device; and
   storing the data from the emulated auxiliary memory region of the magnetic tape medium in a cache;
   wherein the routing the I/O commands to the magnetic tape medium disposed in the tape storage media device comprises routing the I/O commands to the cache.

10. The method of claim 9, further comprising:
    unloading the tape storage media device from the tape drive; and
    prior to unloading the tape storage media device, storing the data in the cache in the emulated auxiliary memory region of the magnetic tape medium.

11. A storage system, comprising:
    a tape drive for reading and writing data to a magnetic tape medium of a tape storage media device;
    an auxiliary memory emulation means for receiving I/O commands to perform I/O operations on an auxiliary memory and for rerouting the I/O commands to perform the I/O operations on the magnetic tape medium of the tape storage media device only if no auxiliary memory is present in the tape storage media device.

12. The storage system of claim 11, wherein the I/O commands comprise SCSI-compliant READ ATTRIBUTE or WRITE ATTRIBUTE commands.

13. The storage system of claim 11, further comprising a tape drive controller, wherein the auxiliary memory emulation means is disposed in the tape drive controller.

14. The storage system of claim 13, wherein:
if the tape drive controller determines that an auxiliary memory is available on the tape storage media device, the auxiliary memory emulation means routes the I/O commands to perform the I/O operations on the auxiliary memory; and
if the tape drive controller determines that an auxiliary memory is not available on the tape storage media device, the auxiliary memory emulation means routes the I/O commands to perform the I/O operations on the magnetic tape medium of the tape storage media device.

15. The storage system of claim 11, further comprising a storage system controller, wherein the auxiliary memory emulation means is disposed in the storage system controller.

16. The storage system of claim 11, further comprising a cache for temporarily storing data associated with the I/O operations.

17. A tape storage media device, comprising:
a housing; and
a magnetic tape medium comprising:
a beginning of tape indicator;
an end of tape indicator;
a data portion positioned between the beginning of tape indicator and the end of tape indicator; and
a emulated auxiliary memory region positioned between the beginning of tape indicator and a tape leader, the emulated auxiliary memory region storing data resulting from I/O operations rerouted from I/O commands to store data on an auxiliary memory, wherein the I/O commands are rerouted only if no auxiliary memory is present in the tape storage media device.

18. The method of claim 17, wherein the housing comprises a tape cartridge.

* * * * *